(12) United States Patent
Knorr et al.

(10) Patent No.: US 10,464,573 B2
(45) Date of Patent: Nov. 5, 2019

(54) PROVISION OF DRIVING-ENVIRONMENT DATA OF A PLANNED ROUTE

(71) Applicant: Robert Bosch GmbH, Stuttgart (DE)

(72) Inventors: Moritz Michael Knorr, Hildesheim (DE); Alexander Geraldy, Hildesheim (DE); Christian Skupin, Garbsen (DE); Daniel Zaum, Sarstedt (DE); Emre Cakar, Sarstedt (DE); Hanno Homann, Hannover (DE); Holger Mielenz, Ostfildern (DE); Isabella Hinterleitner, Hildeshiem (DE); Jochen Marx, Emmerke (DE); Lukas Klejnowski, Hannover (DE); Markus Langenberg, Hannover (DE); Michael Pagel, Magstadt (DE)

(73) Assignee: Robert Bosch GmbH, Stuttgart (DE)

( * ) Notice: Subject to any disclaimer, the term of this patent is extended or adjusted under 35 U.S.C. 154(b) by 163 days.

(21) Appl. No.: 15/554,447

(22) PCT Filed: Feb. 5, 2016

(86) PCT No.: PCT/EP2016/052572
§ 371 (c)(1),
(2) Date: Aug. 30, 2017

(87) PCT Pub. No.: WO2016/162133
PCT Pub. Date: Oct. 13, 2016

(65) Prior Publication Data
US 2018/0050703 A1   Feb. 22, 2018

(30) Foreign Application Priority Data
Apr. 10, 2015   (DE) .......................... 10 2015 206 474

(51) Int. Cl.
*B60W 50/00* (2006.01)
*G01C 21/34* (2006.01)
*B60W 50/04* (2006.01)

(52) U.S. Cl.
CPC ..... *B60W 50/0097* (2013.01); *G01C 21/3415* (2013.01); *B60W 2050/0078* (2013.01); *B60W 2050/046* (2013.01); *B60W 2550/402* (2013.01)

(58) Field of Classification Search
None
See application file for complete search history.

(56) References Cited

U.S. PATENT DOCUMENTS

| | | | | |
|---|---|---|---|---|
| 5,311,434 A | * | 5/1994 | Tamai ................ | G01C 21/3415 340/990 |
| 2001/0029429 A1 | * | 10/2001 | Katayama .......... | G01C 21/3415 701/411 |

(Continued)

FOREIGN PATENT DOCUMENTS

| | | |
|---|---|---|
| DE | 102005024403 A1 | 1/2007 |
| JP | 2002048573 A | 2/2002 |

(Continued)

OTHER PUBLICATIONS

International Search Report dated Apr. 6, 2016, of the corresponding International Application PCT/EP2016/052572 filed Feb. 5, 2016.

*Primary Examiner* — Rami Khatib
(74) *Attorney, Agent, or Firm* — Norton Rose Fulbright US LLP; Gerard Messina

(57) ABSTRACT

A method for providing driving-environment data for a driver-assist system on board a motor vehicle includes determining a route to be traveled; providing driving-environment data along the determined route, driving-environment data along an initial section of a road deviating from the route additionally being provided; determining that the (Continued)

motor vehicle is traveling on the road; determining a new route that includes the traveled road; and providing driving-environment data along the new route.

9 Claims, 2 Drawing Sheets

(56) References Cited

U.S. PATENT DOCUMENTS

| | | |
|---|---|---|
| 2002/0147545 A1 | 10/2002 | Norimoto |
| 2004/0253965 A1 | 12/2004 | Sato et al. |
| 2006/0007022 A1 | 1/2006 | Endo et al. |
| 2006/0106534 A1 | 5/2006 | Kawamata et al. |
| 2007/0055441 A1 | 3/2007 | Retterath et al. |

FOREIGN PATENT DOCUMENTS

| | | | |
|---|---|---|---|
| JP | 2003240572 A | 8/2003 |
| JP | 2004125553 A | 4/2004 |
| JP | 2006226896 A | 8/2006 |
| JP | 2007003457 A | 1/2007 |

\* cited by examiner

PROVISION OF DRIVING-ENVIRONMENT DATA OF A PLANNED ROUTE

FIELD

The present invention relates to a driver assist for a motor vehicle. In particular, the present invention relates to the provision of driving-environment data for the driver assist along a planned route.

BACKGROUND INFORMATION

On board a motor vehicle, a driver assist is provided that is intended to assist or, in part, to replace a driver. To that end, the driver assist may be equipped, for example, to carry out a longitudinal or lateral control of the motor vehicle in supportive, semi-automatic, highly automated or fully automatic fashion. Generally, however, it is possible for the driver to overrule the driver assist and, by braking or steering, for example, to cause the vehicle to carry out a different maneuver than was planned by the driver assist. In general, such an ability of a driver assist to be interrupted is regarded as important in order to increase a driver's acceptance of the driver assist. This holds true especially for those driver assists which are not capable of behaving completely autonomously.

The route on which the motor vehicle is to be guided is usually known to the driver assist. To that end, for example, a destination point may be defined, to which a navigation system determines a route, starting from an instantaneous position of the motor vehicle. To permit better reaction to influences in an area surrounding the motor vehicle, driving-environment data may be provided, for example, from a backend system. For instance, such driving-environment data may include information which goes beyond cartographical data in a map memory of the navigation system. Based on a specific route, the driving-environment data for the route may be made available to the driver assist.

If the driver overrules the navigation system and leaves the predetermined route, the driving-environment data is thus not immediately available for the area surrounding the motor vehicle. To provide updated data in the current driving environment of the motor vehicle, a certain time may therefore elapse. During this time, the driver assist can only be used with reduced accuracy or not at all.

An object of the present invention is to provide a method, a computer-program product and an apparatus for the improved provision of driving-environment data for a driver-assist system on board a motor vehicle. The present invention achieves this objective with the aid of the subject matter described herein. Preferred specific embodiments are described herein.

SUMMARY

A method for providing driving-environment data for a driver-assist system on board a motor vehicle includes the steps of determining a route to be traveled, providing driving-environment data along the determined route, in doing which, driving-environment data along an initial section of a road deviating from the route additionally being provided, determining that the motor vehicle is traveling on the road, determining a new route that includes the traveled road, and providing driving-environment data along the new route.

It may thereby be ensured that driving-environment data in the area of the motor vehicle is also available when a driver of the motor vehicle intervenes in the control and leaves the route. The driver-assist system is thus immediately able to make use of the driving-environment data. Accuracy or execution quality of the driver-assist system is thereby able to remain intact, without taking away from the driver the possibility of intervening in a driving process.

The provision of driving-environment data may include a download from a source outside of the motor vehicle. In particular, the driving-environment data may be obtained wirelessly from a suitable data supplier. By limiting the additional driving-environment data to an initial section of the road, only relatively little additional data must be transported. A transmission time may thereby be reduced. In addition, it is possible to avoid the download of extensive data for several alternative routes, which can lead to increased service usage and therefore to increased operating costs. For example, an available bandwidth of a wireless connection to the source of driving-environment data may be better utilized. Particularly when the data is transmitted wirelessly from the off-board source, a significant latency period may elapse between a request for data and the transmission of the data. Because the volume of data downloaded is reduced, the latency period may also have a less disturbing effect.

In one specific embodiment, the route is subdivided into sections, driving-environment data being made available for a section upon approach of the motor vehicle to the section. In other words, the driving-environment data does not have to be provided once only for the entire route, but rather, may be downloaded section for section when it becomes needed. In this way, the transmission of the driving-environment data along the entire route may be staggered over time. For example, the time elapsed between the determination of the route to be traveled and the end of a transmission of driving-environment data may thereby be reduced. In addition, it is thus possible to avoid the download of driving-environment data for a road section which is not used by the motor vehicle because of an event, a change of plan or a driver intervention.

Preferably, sections adjoin each other wherever a road branches off from the route. Thus, a first section of the route extends from the present position of the motor vehicle up to the next branching, a further section from there up to the next branching and so forth. The last section extends between the last branching and a route destination. The route may thus be planned and traveled in improved fashion, bit by bit. In addition to driving-environment data for an upcoming section of the route, driving-environment data may be made available for initial sections of roads that fork off from a starting point or end point of the route section. Thus, driving-environment data may be held ready in reserve for any foreseeable driver intervention.

In so doing, preferably only those roads are considered onto which it is possible to turn off in keeping with existing driving rules. The volume of driving-environment data held ready for use just in case may thereby be reduced. For example, the driving rules may include a turning ban or an assignment of a direction to a traveled traffic lane.

Furthermore, only those roads may be considered whose usage results in a loss in travel time that lies below a predetermined threshold value, compared to the determined route. By assuming that the driver will not select a route with a very high loss in travel time, the driving-environment data held ready just in case may be further reduced.

In another specific embodiment, the length of the initial section is selected, subject to a time for providing driving-environment data, to be great enough to make driving-environment data available for a continuative section of the road before the motor vehicle, maintaining a predetermined maximum speed, leaves the initial section. In other words, it is preferred that the initial section of the road be long enough so as, while driving along it, to provide driving-environment data seamlessly for a contiguous part of the road. The provision time may be estimated on the basis of an available bandwidth. The maximum speed may be determined on the basis of a top speed allowed on the road.

The driving-environment data preferably includes at least a geometric description of a road routing or traffic-lane routing, a position of a traffic light, a traffic sign or a road marking, traffic-flow information or a dynamic traffic regulation. In this context, differentiation may be made between dynamic information which may change daily or hourly, and static information.

A computer-program product includes program-code for carrying out the described method when the computer-program product runs on a processing device or is stored on a computer-readable data carrier.

An apparatus for providing driving-environment data for a driver-assist system on board a motor vehicle includes a determination device for determining a route to be traveled, a provision device for providing driving-environment data along the determined route, the provision device being set up to additionally provide driving-environment data along an initial section of a road deviating from the route, a scanning device for determining that the motor vehicle is traveling on the road, and a control device which is equipped, with the aid of the determination device, to determine a new route that includes the traveled road, and with the aid of the provision device, to provide driving-environment data along the new route.

BRIEF DESCRIPTION OF THE DRAWINGS

The present invention is described in greater detail below with reference to the figures.

DETAILED DESCRIPTION OF EXAMPLE EMBODIMENTS

Figure 1:
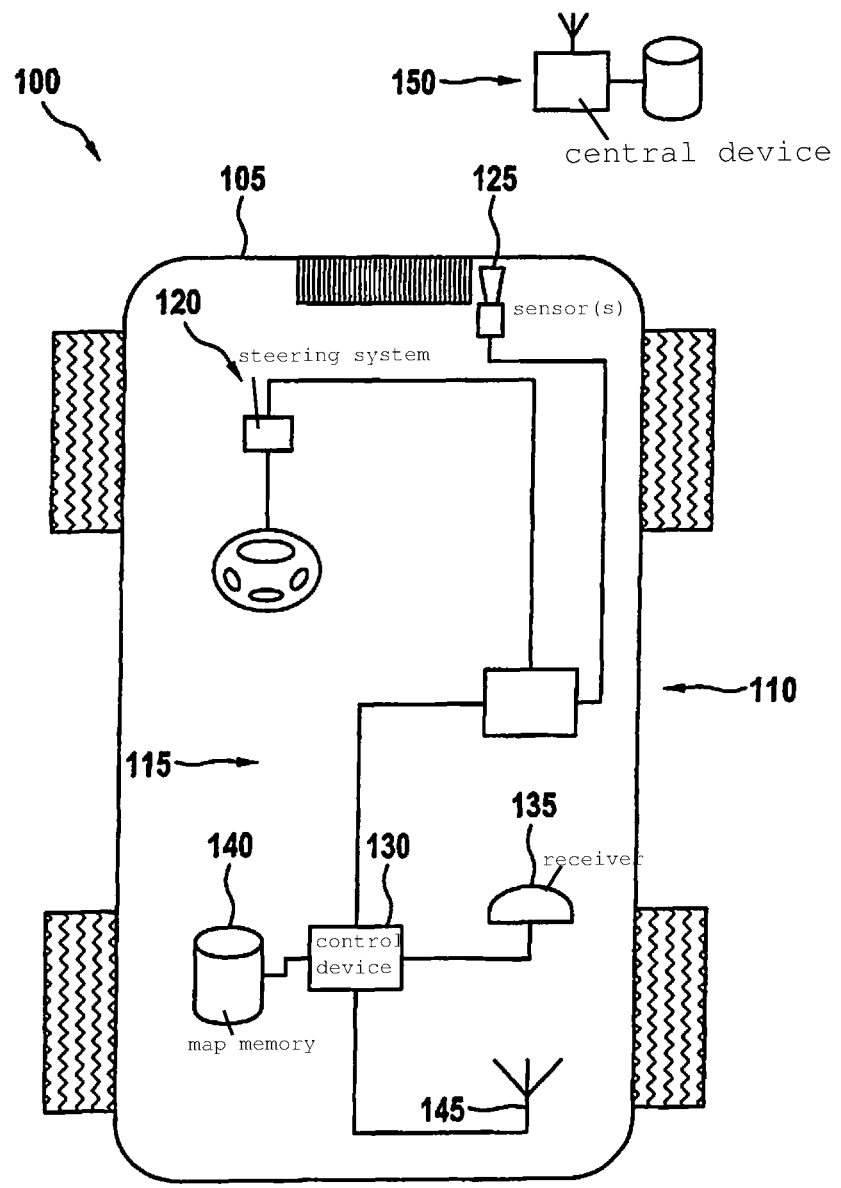
FIG. 1 shows a schematic representation of a motor vehicle.

FIG. 1 shows a schematic representation of a motor vehicle 100. On board motor vehicle 100, an apparatus 105 is provided for determining driving-environment data. Preferably, the driving-environment data is made available to a driver-assist system 110 on board motor vehicle 100. In exemplary manner, driver-assist system 110 shown contains a lane-keeping assist that includes a processing device 115, which is able to influence a steering system 120 of motor vehicle 100. Optionally, driver-assist system 110 additionally includes one or more sensors 125 for sensing a driving environment of motor vehicle 100. In particular, sensor 125 may include a camera, a radar sensor or a lidar sensor.

Apparatus 105 includes a control device 130, in which a plurality of functions may be realized in integrated fashion. For instance, based on a position signal of a receiver 135, especially a satellite navigation receiver, and optionally, data from a map memory 140, control device 130 is able, namely, to determine a position of motor vehicle 100 and a route to a predetermined destination point input by a driver of motor vehicle 100. These functions are usually performed by a navigation system. In addition, control device 130 is connected to a communication device 145, via which driving-environment data with regard to a position or a planned route may be received. Communication device 145 may specifically include a wireless interface to a central device 150, which provides driving-environment data with respect to a corresponding query. The driving-environment data may be dynamic if its validity relates to a short period of time, e.g., a day, a predetermined number of hours or a predetermined number of minutes, or static if the information pertains to a longer period of time. In this sense, for example, a one-day construction site may be regarded as dynamic information, and a large construction site, for instance, on the occasion of a tunnel construction, may be viewed as static information. Dynamic driving-environment data may pertain to traffic-flow information, for example, or a dynamic traffic regulation. Static driving-environment data may pertain to a geometric description of a road routing or traffic-lane routing, for instance, or a position of a traffic light, a traffic sign or a road marking. In one specific embodiment, no distinction is made between dynamic and static information.

Control device 130 is equipped, based on a determined route for motor vehicle 100, to provide driving-environment data for the route. To that end, the route is preferably subdivided into sections, and driving-environment data is made available for an upcoming route section, while a route section before it is being traversed. The splitting of a route into sections is described in greater detail below with reference to FIG. 2.

It is proposed to determine where a road branches off from the determined route. Driving-environment data is then made available for an initial section of this road in anticipation. If motor vehicle 100 deviates from the determined route, e.g., because a driver decides upon a different route, then control device 130, especially with the aid of receiver 135, is able to determine that motor vehicle 100 is driving on the road, and provide driving-environment data for the further road. In particular, a new route may be determined which contains the road, and driving-environment data may be provided as described above. In this way, it is possible to ensure that driver-assist system 110 has up-to-date driving-environment data available at all times, even if motor vehicle 100 unexpectedly does not follow the predetermined route.

Figure 2:
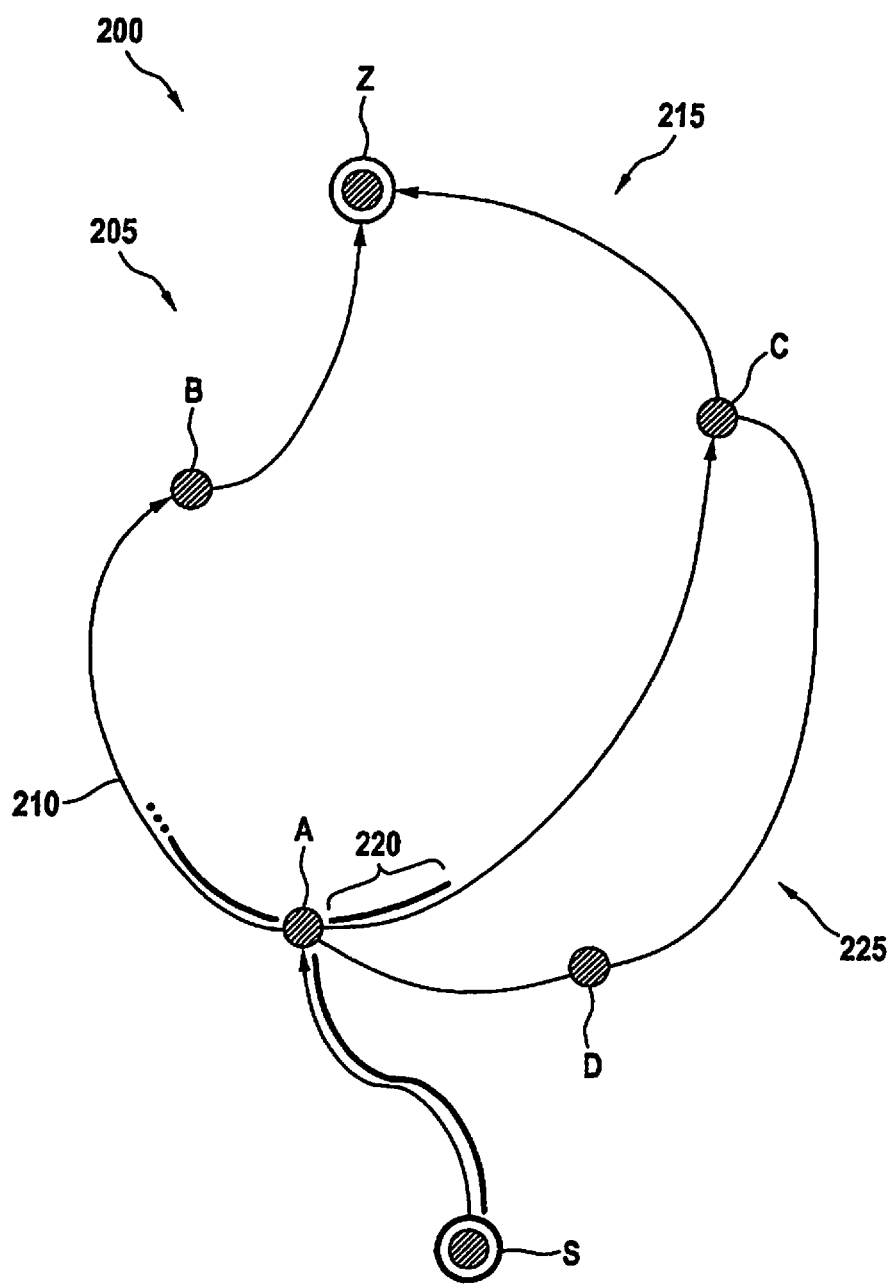
FIG. 2 shows a representation of a road network between a starting position and a destination position of the motor vehicle from FIG. 1.

FIG. 2 shows an exemplary road network 200 between a starting position S and a planned destination position Z of motor vehicle 100 from FIG. 1. For example, starting position S may be determined with the aid of receiver 135, while destination position Z is usually indicated by a driver of motor vehicle 100. However, heuristics are also possible, which are able to determine destination position Z on the basis of earlier trips with motor vehicle 100, for example.

A first route 205 runs from S via intermediate points A and B to Z. In this context, first route 205 is subdivided into sections 210, which in each case adjoin one another in the area of an intermediate point A, B. First route 205 thus includes sections SA, AB and BZ.

Further exemplary intermediate points C and D are also provided. Connections AC, CZ, AD and DC exist for them.

Driving-environment data is provided for each section 210 for the trip between S and Z. Preferably, the driving-environment data is provided successively, by making driving-environment data available for an upcoming section 210 before this section 210 is traveled on. For example, at the beginning of the trip from S to Z, initially only driving-environment data for section SA may be determined. The driving-environment data determined is represented as a bold line next to the connecting lines of sections 210. When motor vehicle 100 approaches intermediate point A, driving-environment data may then be provided for following section AB. The driving-environment data is already available for following section AB when motor vehicle 100 passes intermediate point A At intermediate point A, the possibility exists to leave first route 205 and to turn off onto road AC which, together with CZ, forms a second route 215. It is proposed that even before motor vehicle 100 has reached intermediate point A, to already provide driving-environment data for an initial section 220 of the road leading away from first route 205. If at intermediate point A, the driver of motor vehicle 100 should overrule driver-assist system 110 and take road AC, then at least for initial section 220, driving-environment data is ready immediately for driver-assist system 110. While motor vehicle 100 is driving along initial section 220, further driving-environment data along road AC is made available. Preferably, second route 215 is determined while initial section 220 is being traversed, so that subsequently, driving-environment data may again be provided section by section.

The length of initial section 220 may be a function of a maximum speed of motor vehicle 100 and a time which is necessary to provide continuative driving-environment data. For example, if approximately 10 seconds are necessary to request and download the information from central device 150, and if it may be assumed that during this time, vehicle 100 travels with a speed no higher than 50 km/h, then initial section 220 must amount to at least 150 meters.

Preferably, driving-environment data is made available in anticipation only for those roads 210 onto which it is possible to turn off in keeping with existing driving rules. For example, there may be a turning ban from section SA onto road AD, so that driving-environment data does not have to be provided in anticipation for road AD.

In a further specific embodiment, it may also be checked whether the use of a road 210 will result in a loss of travel time that lies above a predetermined threshold value. This threshold value may be indicated absolutely, e.g., in minutes, or relatively, for example, based on the prospective travel time along first route 205. If the loss in travel time is greater than the predetermined threshold value, then the use of a road 210 which causes this loss in travel time may be disregarded. Driving-environment data is then not provided in anticipation for this road 210. In the representation of FIG. 2, this could hold true for a third route 225, for example, which leads from S via D and C to Z.

What is claim is:

1. A method for providing driving-environment data for a driver-assist system on board a motor vehicle, the method comprising:
    determining, via a control device having a processor, a route to be traveled;
    providing, via sensors, driving-environment data along the determined route;
    providing, via the sensors, driving-environment data along an initial section of a road deviating from the route;
    determining, via the control device, that the motor vehicle is traveling on the road;
    determining a new route that includes the road on which the motor vehicle is traveling; and
    providing, via the sensors, driving-environment data along the new route;
    wherein a length of the initial section is selected, subject to a time for providing driving-environment data, to be long enough to make driving-environment data available for a continuative section of the road before the motor vehicle, maintaining a predetermined maximum speed, leaves the initial section.

2. The method as recited in claim 1, wherein the provision of driving-environment data includes a download from a source outside of the motor vehicle.

3. The method as recited in claim 1, wherein the route is subdivided into sections, and driving-environment data is made available for a section upon approach of the motor vehicle to the section.

4. The method as recited in claim 3, wherein sections adjoin each other wherever a road branches off from the route.

5. The method as recited in claim 4, wherein only roads are considered on which the motor vehicle may travel without violating any traffic rules.

6. The method as recited in claim 4, wherein only roads are considered whose usage results in a loss of travel time that lies below a predetermined threshold value compared to the determined route.

7. The method as recited in claim 1, wherein the driving-environment data includes at least one of the following items of information:
    a geometric description of a road routing or traffic-lane routing;
    a position of a traffic light, a traffic sign or a road marking;
    traffic-flow information; and
    a dynamic traffic regulation.

8. A non-transitory computer-readable medium having a computer program, which is executable by a processor of a control device, comprising:
    a program code arrangement having program code for providing driving-environment data for a driver-assist system on board a motor vehicle, the program code, by performing the following:
        determining, via the control device, a route to be traveled;
        providing, via sensors, driving-environment data along the determined route;
        providing, via the sensors, driving-environment data along an initial section of a road deviating from the route;
        determining, via the control device, that the motor vehicle is traveling on the road;
        determining, via the control device, a new route that includes the road on which the motor vehicle is traveling; and
        providing, via the sensors, driving-environment data along the new route;
    wherein a length of the initial section is selected, subject to a time for providing driving-environment data, to be long enough to make driving-environment data available for a continuative section of the road before the motor vehicle, maintaining a predetermined maximum speed, leaves the initial section.

9. An apparatus for providing driving-environment data for a driver-assist system on board a motor vehicle, comprising:
    a processing device configured to perform the following:
        determining, via a control device, a route to be traveled;
        providing, via sensors, driving-environment data along the determined route, and additionally providing driving-environment data along an initial section of a road deviating from the route;
        determining, via the control device, that the motor vehicle is traveling on the road; and determining, via the control device, a new route that includes the road on which the motor vehicle is traveling to provide, via the sensors, driving-environment data along the new route;

wherein a length of the initial section is selected, subject to a time for providing driving-environment data, to be long enough to make driving-environment data available for a continuative section of the road before the motor vehicle, maintaining a predetermined maximum speed, leaves the initial section.

* * * * *